United States Patent [19]
Linton

[11] 3,925,927
[45] Dec. 16, 1975

[54] HERBICIDE ROLLER FOR WEED CONTROL

[76] Inventor: Thomas Harry Linton, 48 Farmcrest Drive, Agincourt, Ontario, Canada

[22] Filed: Feb. 8, 1974

[21] Appl. No.: 440,940

[52] U.S. Cl. ............... 47/1.5; 71/115; 71/116; 71/117; 71/DIG. 1; 401/208; 401/49
[51] Int. Cl.² ............... A01C 15/02; A01G 1/12
[58] Field of Search .......... 47/1, 1.5; 401/140, 208, 401/49; 71/115 AD, 117; 15/104.93, 230.11

[56] References Cited
UNITED STATES PATENTS

| | | | |
|---|---|---|---|
| 2,528,657 | 3/1948 | Hobe | 401/218 |
| 2,696,696 | 12/1951 | Tigerman | 47/1.5 |
| 2,811,733 | 11/1954 | Sloan | 15/230.11 |
| 2,887,711 | 5/1959 | Hutchinson | 15/230.11 |
| 3,232,006 | 2/1966 | Atherton et al. | 47/1.5 |

FOREIGN PATENTS OR APPLICATIONS

| | | | |
|---|---|---|---|
| 612,956 | 1/1961 | Canada | 47/1.5 |
| 893,818 | 9/1959 | United Kingdom | |

*Primary Examiner*—Edgar S. Burr
*Assistant Examiner*—James R. Feyrer
*Attorney, Agent, or Firm*—David W. Wong; Arne I. Fors

[57] ABSTRACT

A resinous herbicidal compound is provided in the form of a roller. The herbicide may be applied in lawns and gardens without the danger of being spread by wind or washed away by rain or dew. The herbicidal compound comprises a selected chemical herbicide or a number or herbicides homogeneously dispersed in a synthetic wax carrier. The synthetic wax is hard to break down by natural process, thus enabling the herbicides to remain on the weeds to control their growth.

3 Claims, 3 Drawing Figures

U.S. Patent  Dec. 16, 1975  3,925,927
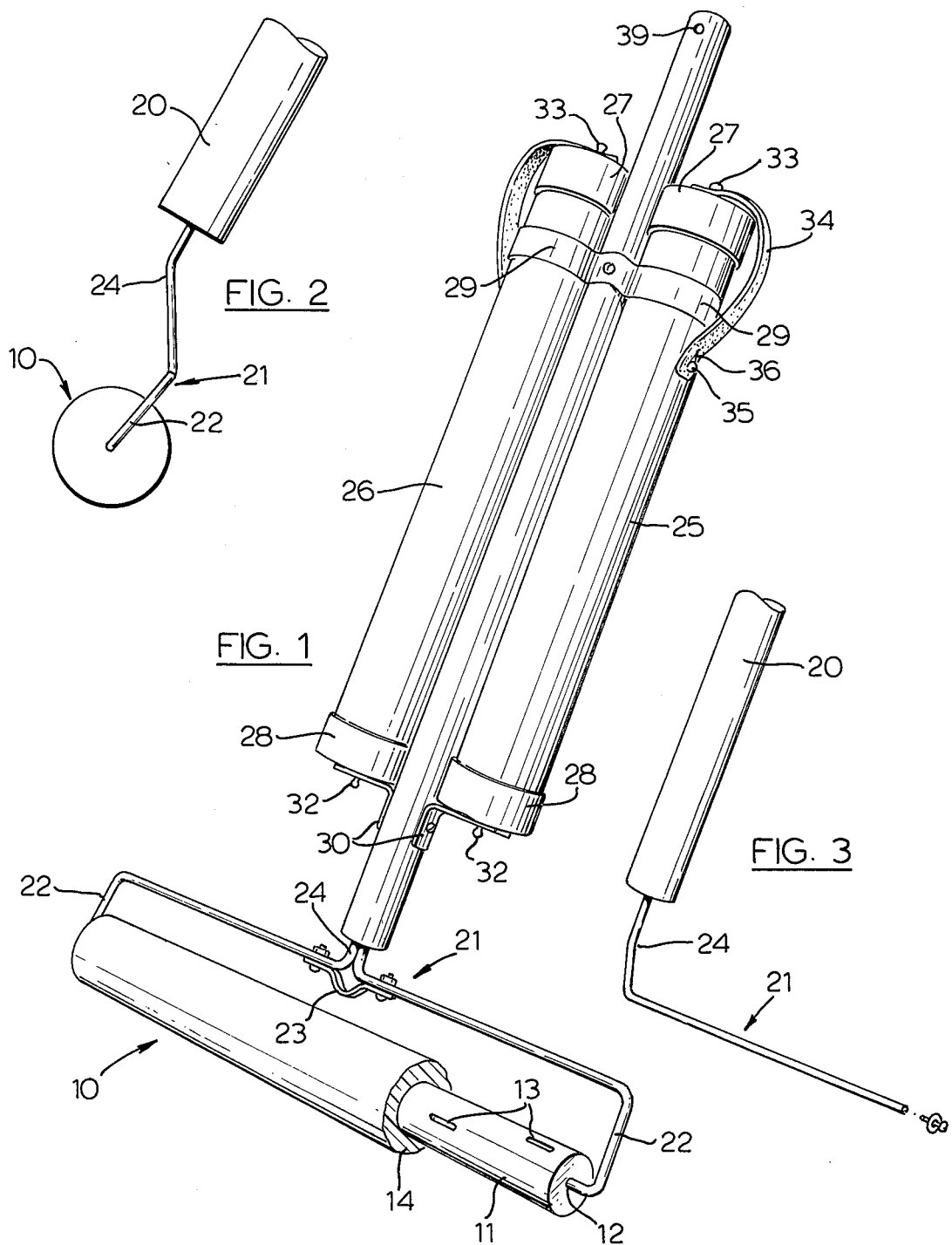

HERBICIDE ROLLER FOR WEED CONTROL

BACKGROUND OF THE INVENTION

This invention relates to the control of weed growth in lawns and gardens and, more particularly, to chemical control of weed growth.

Weed control by the application of chemicals in lawns and gardens has been widely used, and such method has been found to be the most effective and convenient method for controlling weeds. In such method, chemical compounds called herbicides such as 2,4-dichlorophenoxyacetic acid are deposited commonly by spraying on the weeds. The herbicides will cause the weeds to defoliate and eventually to die, yet the herbicides are not harmful to grass.

Chemical herbicides are commonly provided to the user in the form of concentrated aqueous solutions. The user must dilute the aqueous solution into a workable solution of a predetermined concentration, and the dilute solution is sprayed over the entire lawn or in selected areas where weeds are growing actively. However, such herbicidal solution cannot be applied to the lawn during rainy periods since it will be either highly diluted by the rain or be washed away thereby. Heavy dew will also weaken the effectiveness of the herbicide solution. Also, it cannot be used in windy conditions even when the wind is moderate, because the spray and fume of the herbicidal solution will be easily blown away by the wind. The spray and fume of the herbicides are harmful to human as well as to other ornamental plants located in the neighbourhood, thus this presents a large problem to the effective application of such herbicides.

In order to avoid breathing in the fume and vapour of the herbicide, the user normally drags the applicator behind him so that the harmful fume and vapour are blown away from him. This common practice also enables the user to avoid walking over the treated area such that the herbicide solution can cause contamination to his clothing. However, in this manner of application, the applicator is not under full control and the user does not have a clear view of the area being treated.

Furthermore, the herbicidal solution must be prepared carefully according to the recommended concentration and applied to the lawn evenly in a correct quantity, otherwise the herbicides will cause the grass to wilt or brown, a condition which is commonly referred to as "burning" of the grass, making the lawn very unsightly and resulting in unhealthy grass growth. Also, the herbicides are extremely poisonous, such that it is hazardous for the user to handle the concentrated aqueous solution of the herbicides while preparing the diluted solution for use.

PURPOSE OF THE INVENTION

It is the principal object of the present invention to provide a herbicidal composition which may be used without being affected by wind, rain and dew.

It is an object of the present invention to provide a herbicidal composition which the user may use directly without any further preparation.

It is another object of the present invention to provide a herbicidal composition in the form of a resinous roller which may be used easily.

It is yet another object of the present invention to provide a herbicidal composition which marks the area that has been treated for ready identification.

SUMMARY OF THE INVENTION

The herbicidal composition according to the present invention is made in the form of a roller having a layer of resinous herbicidal compound disposed on the surface of a cylindrical core. The herbicidal compound comprises a selected herbicide material homogeneously dispersed in a synthetic wax base. The synthetic wax is softened to a resinous state by a softener which also enhances the bonding between the molecules of the wax and the herbicide material.

The herbicide material may be applied to the weed by simply rolling the roller over the weed in the lawn or garden. Only a slight downward pressure needs to be applied to the roller during application. By attrition, the herbicide material carried by the synthetic wax will adhere to the leaves of the weed in the form of a resinous coating. This coating can not be washed away by rain or dew deposit. The synthetic wax base contains no natural wax and mineral or vegatable oil, thus it is very hard to break down through natural process; therefore, the herbicide material remains on the weed over a long period of time to be thoroughly absorbed thereby and to control the weed growth. The application of such herbicidal composition is not affected by wind, rain or dew. The applicator is pushed in front of the user such that it is completely under the control of the user who also has a clear view of the area being treated.

These and other objects of this invention together with its advantages will be more apparent from the following description and drawings which illustrate a specific embodiment by way of example and in which:

BRIEF DESCRIPTION OF THE DRAWING

FIG. 1 is a perspective view of a herbicidal roller according to the present invention together with an implement for applying the herbicidal roller;

FIG. 2 is a side elevation of the roller applicator showing a bracket having a bent portion; and FIG. 3 is a perspective view of an alternative form of applicator having a single elongated roller mounting axle.

DESCRIPTION OF SPECIFIC EMBODIMENT

The weed control roller according to the present invention is generally shown by reference numeral 10. The roller 10 includes an elongated cylindrical core 11 which may be made of any suitable material such as plastics, pressed cardboard, wood or other similar type of material. The core 11 may be either tubular or alternatively a solid member having an end opening 12 formed at both ends therein. A plurality of indentations 13 are formed on the peripheral surface of the core such that the peripheral surface is substantially roughened or knurled. As shown in the drawing, the indentations 13 are elongated rectangular depressions formed in a staggered manner throughout the entire peripheral surface of the core.

A layer of resinous herbicidal compound 14 is formed on the peripheral surface. Some of the resinous herbicidal compound extends into the indentations 13 to enhance the adherence of the compound to the core and also to eliminate any relative motions between them.

The resinous herbicidal compound comprises mainly a selected chemical herbicide material homogeneously dispersed in a synthetic wax base. The following examples show some specific embodiments of the herbicidal compound. These examples are included for illustration purposes only and in no way are intended to limit the scope of the invention.

The herbicide 2(-4-chloro-2-methylphenoxy) propionic acid is sold commercially under the trade name of MCPP Mecroprop, and 2-methoxy-3,6-dichlorobenzoic acid is available under the trade name CMPP dicamba and 2-methyl-4-chlorophenoxyacetic acid is commercially known as MCPA. These herbicides are highly susceptible to ordinary weeds commonly found in lawns and gardens.

EXAMPLE 2

| | |
|---|---|
| Synthetic wax | 75 to 90% by volume |
| Dibutyl phthalate | 4.6 to 9.7% by volume |
| 2(-4-chloro-2-methylphenoxy)propionic acid | 2.4 to 4.8% by volume |
| 2-methoxy-3,6-dichlorobenzoic acid | 2.4 to 4.8% by volume |
| 2-methyl-4-chlorophenoxyacetic acid | 2.4 to 4.8% by volume |
| Colour pigment | optional |

EXAMPLE 1

EXAMPLE 1

| | |
|---|---|
| Synthetic wax (N,N'-ethylene bis stearamide) | 75 to 90% by volume |
| Softener & plasticizer (PARAPLEX WP1 - a trade mark) | 4.6 to 9.7% by volume |
| 2(-4-chloro-2-methylphenoxy)propionic acid | 2.4 to 4.8% by volume |
| 2-methoxy-3,6-dichlorobenzoic acid | 2.4 to 4.8% by volume |
| 2-methyl-4-chlorophenoxyacetic acid | 2.4 to 4.8% by volume |
| Colouring pigment | optional |

The synthetic wax is a microcrystal synthetic wax which contains no natural wax. Such synthetic wax turns into a molten state when heated to a temperature over about 200°F. PARAPLEX is a polymeric plasticizer which is a modified alkyd resin consisting mainly of sebacic acid alkyds. The plasticizer is added into the molten synthetic wax which becomes plasticized such that its molecules possess a high affinity to bond with the molecules of any herbicide material. In the meantime the plasticizer has the property of softening the synthetic wax to a resinous form when it is cooled thereafter.

The herbicide material is added into the plasticized molten synthetic wax which due to its high affinity to the herbicide molecules, will disperse the herbicide molecules homogeneously throughout the entire wax base. Three types of chemical herbicides are used in this example in order that the roller can be generally used for controlling all common weeds in lawns and gardens. It can be understood that one selected kind of these herbicides may be used such that the roller is suitable for controlling a specific type of weed.

In this example, dibutyl phthalate is used as a softener as well as a plasticizer instead of paraplex used in Example 1.

EXAMPLE 3

| | |
|---|---|
| Synthetic wax | 75 to 90% by volume |
| Dibutyl phthalate | 4.6 to 9.7% by volume |
| 2(-4-chloro-2-methylphenoxy)propionic acid | 2.4 to 4.8% by volume |
| 2-methoxy-3,6-dichlorobenzoic acid | 2.4 to 4.8% by volume |
| 2-methyl-4-chlorophenoxyacetic acid | 2.4 to 4.8% by volume |
| Colour pigment | optional |

EXAMPLE 4

| | |
|---|---|
| Synthetic wax | 25% to 30% by volume |
| Synthetic resin | 50% to 60% by volume |
| Dibutyl phthalate | 4.6 to 9.7% by volume |
| 2(-4-chloro-2-methylphenoxy)propionic acid | 2.4 to 4.8% by volume |
| 2-methoxy-3,6-dichlorobenzoic acid | 2.4 to 4.8% by volume |
| 2-methyl-4-chlorophenoxyacetic acid | 2.4 to 4.8% by volume |
| Colour pigment | optional |

The herbicidal compound of Example 4 has a rather tacky surface. This tackiness may be eliminated by adding a small amount (about 2 to 4 percent by volume) of ethoxylated nonyl phenol commercially known as rexol 25J into the composition. The synthetic resin used is a hydrocarbon synthetic resin.

To construct the roller according to the present invention, the cylindrical core is centrally located in a cylindrical mould, and the molten mixture as shown above is introduced into the mould and left to cool and set. The set layer is resinous and relatively tacky.

In use, the roller is simply rolled over the weed such that a coating of the herbicidal compound will be rubbed off and adhered to the weed by attrition. The coating will remain on the leaves of the weed for up to seven days. The coating cannot be washed off by rain or heavy dew and no spary or fume will drift from the applicator to the bordering areas. Thus, the herbicides in the compound are slowly and fully absorbed by the weed to control its growth.

A selected colouring pigment may be added in the herbicidal compound such that the compound when applied to the lawn will provide a colour coating to identify the area which has been treated. This will eliminate the unnecessary accidental repeating treatment of the same area in the lawn. Also, a large area of lawn may be treated at separate times since only the treated area is marked by the colour. The colouring pigment is preferably the type which will break down by exposure to sun and air such that it will disappear eventually without leaving a permanent colouring in the lawn.

The roller according to the present invention may be applied to the lawn by using any convenient applicator having a handle and a bracket for rotatably mounting the roller thereon. The applicator may have a long handle such that the user can apply the roller over the ground in an upright position. Rollers of various lengths may be used according to the size of the area to be covered. A short roller may be used for spot treating selected areas in the lawn and an applicator having a short handle may be used for treating small areas around the garden.

FIG. 1 shows an applicator suitable for use with the roller. The applicator has an elongated handle 20 which may have a length such that the user can apply the roller on the ground in a standing upright position. A roller bracket 21 is mounted at one end of the handle. As shown in the drawing, the bracket may be made of a resilient rod having a substantially U-shaped configuration which has two spaced leg portions 22.

The ends of the leg portions 22 are bent inwards to form two axles adaptable to be received within the end openings 12 of the roller core 11, so as to mount the roller rotatably in the bracket. The rod may be made of iron or steel or similar material which possesses sufficient flexibility to allow either one of the leg portions 22 to be pivoted outwards by a slight bending force for mounting the roller in the bracket. The roller may be mounted by first sliding one end opening 12 over one of the leg axles 22 and pivoting the other leg outwards or sideways until the bracket is opened wide enough to receive the roller and the other leg axle is received within the other end opening 12. The above procedure is reversed in dismounting the roller. Thus, mounting, replacing or removing of the roller from the leg axles is easy, simple and efficient. As shown in FIG. 1, the bracket may have a straight shank portion 24 but a bent portion may be formed therein as best shown in FIG. 2 so that the roller may be used efficiently on level, uneven or terraced areas. The bent portion allows the roller to reach downwards into depressions without having to raise the handle to a vertical position. An arcuate member 23 may be mounted in the joint of the leg portions 22 to provide a reinforcement means for maintaining the leg portions in the desired form.

Alternatively, the bracket 21 may be a single rod as shown in FIG. 3, having a single rod with an elongated horizontal portion which forms the axle for rotatably mounting the roller thereon. A locking means such as a screw or bolt may be mounted at the end of the horizontal portion to prevent the roller from falling out therefrom. This embodiment is particularly suitable for use with short rollers.

At least one cylindrical container 25 may be incorporated on the handle 20. The cylindrical container has a length slightly longer than the roller 10 so that a spare roller may be provided within the container. When the main roller is worn out, the spare roller may be used to replace it and the used roller may be placed in the container temporarily for later disposal. A second container 26 may be provided for holding debris, rocks and weeds. Each container has a removable upper cap 27 and a removable lower cap 28.

The containers 25 and 26 may be releasably mounted on the handle 20 by side mounting bracket 29 and bottom mounting brackets 30. The side mounting bracket consists of two strip members fastened on the handle to form two bifurcated spring-like clasps, the upper portion of the containers are slidably mounted within the clasps and are retained in place by the resiliency of the clasps. The bottom mounting brackets 30 as shown in the drawing, may be in the form of an L-shaped spring-like member. One arm of the L-shaped member is fixedly attached to the handle, so that the other arm is disposing substantially perpendicular to the handle and abuts the lower cap 28 of the container. A slot (not shown) may be formed in the other arm such that a centre pin 32 on the lower cap may be slidably held within the slot to secure the container fixedly on the handle. The containers may be removed by sliding them sideways until the upper portion is released from the clasps and the centre pin 32 is disengaged from the slot of the bottom mounting bracket.

A centre pin 33 is also provided at the removable upper cap 27 such that the cap may be attached to the container by straps 34 which are connected to fixed side pins 35. THe straps 34 are made of a flexible material such as leather and have two slits 36 formed near their ends. The slits 36 are operable to graps the pins 33 and 35 therein to connect the caps to the containers. In this manner, the upper caps 27 will not be misplaced or lost when they are opened. It is apparent from the above descriptions that all the component parts of the applicator are removable separately for cleaning, repair and replacement.

A through opening 39 is formed at the upper end portion of the handle for hanging the applicator in storage.

It can be appreciated that fertilizers and insecticides instead of herbicides may be used in the roller so that the roller may be used to apply fertilizers and/or insecticides in lawns and gardens. Also, grass inhibiting chemicals may be added in the resinous composition such that the roller may be used to control undesirable grass growth in vegetable fields, sidewalk cracks, driveways, patios or selected areas in a garden. In such circumstances, the roller may be used in close proximity of ornamental plants without the risk of affecting the ornamental plants during application.

The embodiments which have been described are intended only to be illustrative of the inventive features involved; various other embodiments and modifications may be made by those skilled in the art without departing from the spirit and scope of the invention.

What I claim as new and desire to protect by Letters Patent of the United States is:

1. A device for applying a selected herbicide to weeds from a roller having a synthetic wax base impregnated with said herbicide, comprising an elongated handle having a longitudinal axis, a U-shaped bracket transversely secured at one end of said handle, said bracket being made of a resilient rod element and having two spaced leg portions with free ends bent towards each other to form axes operative for mounting said roller rotatably thereon, two cylindrical containers slidably and removably mounted on said elongated handle, said cylindrical containers being substantially parallel to the axis of said handle, said cylindrical containers having two open ends covered by removable caps, one of said containers being adapted for holding said roller when the device is not in use and the other container being adapted for holding a replacement roller.

2. A device according to claim 1 including two bifurcated spring-like clasps mounted on said handle, said cylindrical containers being slidably and removably secured in said spring-like clasps.

3. A device according to claim 2 wherein said open ends of said cylindrical containers include bottom ends facing said roller, and said caps include bottom caps removably and frictionally mounted on said bottom ends of said cylindrical containers, each of said bottom caps having a center pin, two L-shaped spring-like members each having one arm mounted to said handle and a slot formed in the other arm, said center pin of each bottom cap being slidably engageable with the slot of a respective L-shaped spring-like member for securing the bottom ends of said cylindrical containers securely.

* * * * *